US008938707B2

(12) United States Patent
Tadagalale et al.

(10) Patent No.: US 8,938,707 B2
(45) Date of Patent: Jan. 20, 2015

(54) METHOD AND SYSTEM FOR CREATING AN EXECUTABLE VERIFICATION PLAN

(75) Inventors: Vishwarao Tadagalale, Bangalore (IN); Ravishankar Rajarao, Bangalore (IN)

(73) Assignee: WhizChip Design Technologies Pvt. Ltd., Bangalore, Karnataka (IN)

(*) Notice: Subject to any disclaimer, the term of this patent is extended or adjusted under 35 U.S.C. 154(b) by 180 days.

(21) Appl. No.: 13/535,810

(22) Filed: Jun. 28, 2012

(65) Prior Publication Data

US 2013/0014077 A1 Jan. 10, 2013

(30) Foreign Application Priority Data

Jun. 30, 2011 (IN) .......................... 2211/CHE/2011

(51) Int. Cl.
G06Q 10/00 (2012.01)
A01K 5/02 (2006.01)
G06F 17/50 (2006.01)
G06F 15/177 (2006.01)
G06F 3/00 (2006.01)
G06F 9/44 (2006.01)
G06F 11/36 (2006.01)

(52) U.S. Cl.
CPC ..... G06F 11/3604 (2013.01); Y10S 707/99931 (2013.01)
USPC ............ 717/101; 705/7.14; 705/29; 707/803; 707/999.001; 709/220; 715/762; 716/104; 717/116

(58) Field of Classification Search
CPC ........... G06F 9/4443; G06F 8/36; G06F 8/61; G06F 8/71; G06Q 30/02; G06Q 30/0621; G06Q 30/0631; G06Q 30/0635; G06Q 10/06; G06Q 10/10; G06Q 10/087
See application file for complete search history.

(56) References Cited

U.S. PATENT DOCUMENTS

| | | | | |
|---|---|---|---|---|
| 5,553,282 A * | 9/1996 | Parrish et al. | ................ | 709/220 |
| 5,659,735 A * | 8/1997 | Parrish et al. | ................ | 717/116 |
| 5,752,245 A * | 5/1998 | Parrish et al. | .......... | 707/999.001 |
| 6,901,372 B1 * | 5/2005 | Helzerman | ................ | 705/7.14 |
| 7,917,873 B1 * | 3/2011 | Canfield et al. | ............... | 716/104 |
| 8,402,438 B1 * | 3/2013 | Andrews et al. | ............... | 717/126 |
| 8,799,113 B2 * | 8/2014 | Markham et al. | ............... | 705/29 |
| 2005/0114829 A1 * | 5/2005 | Robin et al. | ................ | 717/101 |
| 2006/0229896 A1 * | 10/2006 | Rosen et al. | ...................... | 705/1 |
| 2008/0140485 A1 * | 6/2008 | Williams | ........................ | 705/7 |
| 2009/0157419 A1 * | 6/2009 | Bursey | ............................. | 705/1 |
| 2009/0199113 A1 * | 8/2009 | McWhinnie et al. | ......... | 715/762 |
| 2010/0205225 A1 * | 8/2010 | Ahlig et al. | ................... | 707/803 |

* cited by examiner

*Primary Examiner* — Don Wong
*Assistant Examiner* — Anibal Rivera
(74) *Attorney, Agent, or Firm* — Barry Choobin; Patent360 LLC

(57) ABSTRACT

The various embodiments herein provide a method and a system for creating a verification plan in executable structure for verifying a product specification using a web user interface. The method comprises collecting the input parameters through a web user interface. The input parameters are stored in a temporary storage are converted to an object with a format such as XML. An interconnected structure of the related objects is created and transformed into a plurality of complex objects for generating a plurality of features. The stored information is fetched and processed by inserting the structure values into a permanent file based on header tag to identify an object. An output for the processed information is generated and displayed through the web user interface. The milestones of the product are directly mapped to the features for generating the features of the product.

12 Claims, 8 Drawing Sheets

METHOD AND SYSTEM FOR CREATING AN EXECUTABLE VERIFICATION PLAN

CROSS REFERENCE TO RELATED APPLICATION

The present application claims the priority of the Indian Provisional Patent Application No. 2211/CHE/2011 filed on Jun. 30, 2011 with the title "Variable Impedance Scheme for Providing a High Speed Communication", and the contents of which are incorporated by reference herein.

BACKGROUND

1. Technical Field

The embodiments herein generally relate to a project management for products and particularly relate to a verification plan for automatically checking and verifying a product design. The embodiments herein more particularly relates to a method and a system for creating verification plans based on a product specification using a web user interface.

2. Description of the Related Art

In the process of developing software products, generating and maintaining accurate and consistent design specifications is a challenge. Sometimes variable names are misspelt or used inconsistently within the design specification and often these errors go undetected in the inspection process. Further, the variable names referenced in a design specification may be inconsistent with the organization rules, the constraints and the processes, such as variable naming rules etc.

Currently the product designs are tested using a plurality of verification methodologies to determine the efficiency. The verification plan defines the goals for testing a product and provides a detailed information about the product specification and a plurality of parameters associated with the product specification. During the project execution phase, the verification plan serves as a reminder of the goals and requirements of the project verification and the verification plan is instrumental in determining the time of completion of a verification process.

The creation of the verification plans is generally dependent on pre-defined methodological steps and also on the operating platform. In the existing techniques, it is very difficult to reflect the changes made in the verification plan incase of a change in a product specification. When a design specification contains incorrect or inconsistent variable names which are not detected during a document inspection process, then these errors are usually detected by a compiler at the time of compiling the software code associated with the specification. In such a scenario, time and energy or resources are wasted in correcting the errors both in the code and in the design specification. In some organizations, a design specification must comply with a document change control process defined by the organization. Thus the wasting of resources is further enhanced because a revision of a specification document requires generation of a document change request and inspection of the document and the change request further thereby resulting in incurring additional costs, wastage of time and wastage of resources.

Hence there exists a need for an automatic method and system for creating the verification plans for verifying an accuracy of a product design directly from the product specification document. Further there is a need for an automatic method and system to include the changes in a product specification in a verification plan. Yet there is a need for an automatic method and system to create a verification plan to provide a direct mapping of product verification plan with a product specification.

The abovementioned shortcomings, disadvantages and problems are addressed herein and which will be understood by reading and studying the following specification.

OBJECTS OF THE EMBODIMENTS

The primary object of the embodiments herein is to provide a method and a system for creating a verification plan in executable structures for verifying a product specification through a web user interface.

Another object of the embodiments herein is to provide a method and a system for creating a verification plan to enable a direct mapping of a product specification to a product design verification plan.

Yet another object of the embodiments herein is to provide a method and a system to create a verification plan using a web user interface to allow the users to define the product parameters and variables.

Yet another object of the embodiments herein is to provide a method and a system to create a verification plan in executable structures using the web user interface to allow the users to define the values for the product parameters and variables.

Yet another object of the embodiments herein is to provide a method and a system to create a verification to allow the users to define a milestone for each verification plan.

Yet another object of the embodiments herein is to provide a method and a system to create a verification plan to allow the users to define a logic for a combination of product variables to be exercised during a verification process.

Yet another object of the embodiments herein is to provide a method and a system to create a verification plan to allow the users to define the order in which logic should be executed during a testing of a verification plan.

Yet another object of the embodiments herein is to provide a method and a system to create a verification plan to allow the users to set a priority for executing a plurality of test plans.

Yet another object of the embodiments herein is to provide a method and a system to create a verification plan to minimize the time and effort involved in adopting changes in a product specification to a verification plan.

Yet another object of the embodiments herein is to provide a method and a system to create a verification plan to allow the users to view the verification plan in an HTML format.

Yet another object of the embodiments herein is to provide a method and a system to create a verification plan to allow the users to add filters based on feature, assignee and scope of the product.

Yet another object of the embodiments herein is to provide a method and a system to create a verification plan to minimize the effort in modifying the plan whenever there is a change in a product specification.

Yet another object of the embodiments herein is to provide a method and a system to create a verification plan to allow the users to generate the reports at each entry stage.

Yet another object of the embodiments herein is to provide a method and a system to create verification plan to reduce a verification management overhead and time.

These and other objects and advantages of the embodiments herein will become readily apparent from the following detailed description taken in conjunction with the accompanying drawings.

SUMMARY

The various embodiments herein provide a method for creating a verification plan in an executable structure for verifying a product specification. The method comprising the steps of collecting a plurality of input parameters through a web user interface, storing the plurality of input parameters in a temporary storage, converting each input parameter into an object of a defined format, creating an interconnected structure of the related objects, transforming the interconnected structures into a plurality of complex objects, generating a plurality of features using the plurality of complex objects, fetching the generated and stored structures, processing the fetched information by inserting the structure values into a permanent file based on a header tag to identify an object, generating an output for the processed information and displaying the output through the web user interface.

According to an embodiment herein, the method further comprises creating a project workspace for each login and allows an editing of a latest version of the workspace.

According to an embodiment herein, the method further comprises updating the verification plan whenever a product specification is changed. The method comprises collecting a plurality of modified input parameters through the web user interface, storing the plurality of modified input parameters in a temporary storage, converting each input parameter into an object of appropriate format, creating an interconnected structure of the plurality of related objects, storing the interconnected structures in a temporary storage, transforming the interconnected structures into a plurality of complex objects, generating a plurality of features using the plurality of complex objects, fetching the interconnected structures from a temporary storage by a processing module, comparing the fetched values with a plurality of values stored in a permanent file, processing the fetched information by updating structure values based on header tag to identify an object, generating an output for the processed information and displaying the output through the web user interface.

According to an embodiment herein, generating the plurality of features includes mapping the product milestones onto the plurality of features.

According to an embodiment herein, the plurality of input parameters is at least one of product features, parameter names, parameter values and information related to the project management activities.

According to an embodiment herein, the output is at least one of a verification plan and the product milestones.

According to an embodiment herein, the plurality of complex objects is at least one of a combo, a sequence and a macro.

According to an embodiment herein, the permanent file is a data file containing a verification plan framework.

According to an embodiment herein, a system is provided for creating a verification plan in an executable structure for verifying a product specification. The system comprises a web user interface for an user to enter a plurality of input parameters in a tabbed view, a temporary storage for storing the plurality of input parameters, a processing module for processing the interconnected structure of related objects and generating a plurality of outputs, a secondary storage for storing the plurality of outputs and a display module for displaying the plurality of outputs in a plurality of formats. The temporary storage comprises a plurality of XML files for converting each input parameter into an object of appropriate format and creating interconnected structure of a plurality of related objects.

According to an embodiment herein, the processing module is adapted to create an interconnected structure of related objects, transform the interconnected structures into a plurality of complex objects, generating a plurality of features using the plurality of complex objects, fetching a stored information and processing the stored information.

According to an embodiment herein, the web user interface comprises an input module for collecting a plurality of inputs through the web user interface and an output module for displaying the output in a plurality of formats.

According to an embodiment herein, the plurality of formats is at least one of a HTML, a graph, a chart.

According to an embodiment herein, the plurality of XML files acts like a cache file between a front-end and permanent file to help in re-defining the values and inputs dynamically for each execution.

According to an embodiment herein, a secondary storage is disk storage for storing the output.

According to an embodiment herein, the secondary storage includes a plurality of data management techniques.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiments and the accompanying drawings in which.

Figure 1:
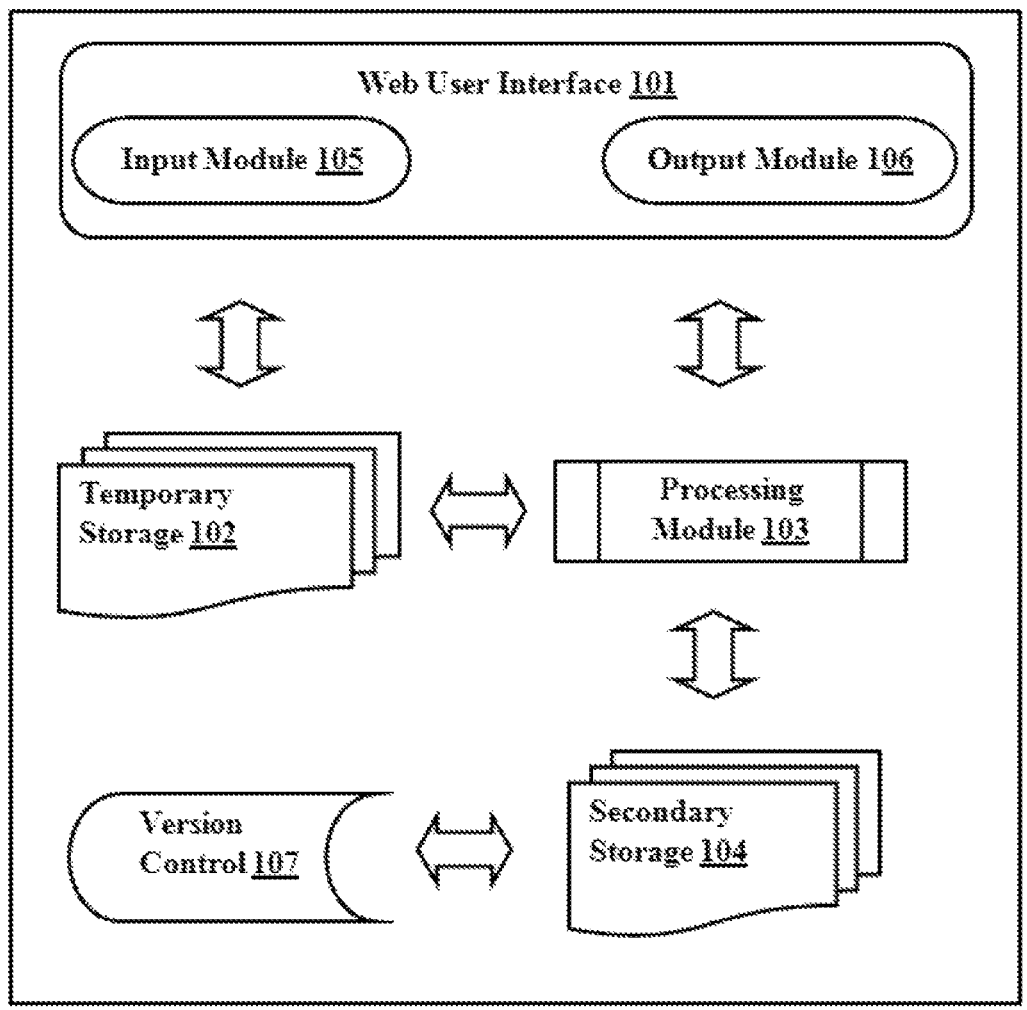
FIG. 1 illustrates a block diagram of a system for creating a verification plan for a product specification in an executable structure, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for creating a verification plan in an executable structure for verifying a product specification using a web user interface. The method comprises the steps of collecting input parameters through a web user interface, storing the input parameters in a temporary storage, converting each input parameter into an object of appropriate format such as XML, creating an interconnected structure of related objects, transforming the interconnected structures into a plurality of complex objects, forming a plurality of features using the plurality of complex objects, fetching the stored structures, processing the fetched information by inserting the structure values into a permanent file based on header tag to identify an object, generating a plurality of outputs for the processed information and displaying the plurality of outputs through the web user interface. The milestones of the product are directly mapped to the features while forming the features of the product. The method further includes the step of creating a project workspace for each login and allows an editing of latest version of the workspace. The method further includes storing the generated output in a secondary storage.

The input is at least one of the product features, the parameter names, the parameter values and the information related to the project management activities.

The plurality of complex objects is at least one or more of combos, sequences, and macros.

The output is displayed in a plurality of formats including a HTML, a graph, and a chart.

According to an embodiment herein, a system is provided for creating a verification plan in the executable structures for verifying a product specification using the web user interface. The system includes a web user interface, a temporary storage for storing the input parameters, plurality of XML files in the temporary storage for converting each input parameter into an object of appropriate format and creating an interconnected structure of related objects, a processing module for processing the interconnected structure of related objects and generating an output and a secondary storage for storing the output. The web user interface includes an input module for collecting the input through the web user interface and an output module for displaying the output in a plurality of formats such as a HTML, a graph, and a chart.

The processing module further creates an interconnected structure of related objects. The processing module transforms the interconnected structures into a plurality of complex objects. The processing module forms a plurality of features using the plurality of complex objects. The processing module further fetches and processes the stored information by inserting the structure values into a permanent file to identify an object based on header tag.

The input is at least one of the product features, the parameter names, the parameter values and the information related to the project management activities. The output is at least one of the verification plan and the milestones of the verification plan. The permanent file is a data file containing a verification plan framework. The web user interface allows the user to enter the input in a tabbed view.

The temporary storage comprises of multiple XML files for storing inputs provided in various tabs in an interconnected fashion. The multiple XML files acts like a cache file between front-end and permanent file to re-define the values and the inputs dynamically for each execution.

The secondary storage is disk storage. The secondary storage stores the output. The secondary storage includes one or more data management techniques such as version control and work space management for changing a management of the verification plan. The version control technique is any one of the standard version control systems such as CVS, SVN etc.

The processing module checks both temporary storage and workspace based on the control input provided.

The system enables to specify the execution parameters at very high level and change the execution parameters dynamically. The subsets of the verification plan are generated dynamically based on the input parameters.

The various embodiments herein provide a method and a system to represent a verification plan in executable structures to provide an option to update the verification plan whenever a product specification is changed. The method comprises the steps of collecting modified input parameters through a web user interface, storing the modified input parameters in a temporary storage, converting each input parameter into an object of appropriate format, creating an interconnected structure of the related objects, transforming the interconnected structures into a plurality of complex objects, forming a plurality of features using the plurality of complex objects, fetching the interconnected structures from a temporary storage using a processing module, comparing the fetched values with a plurality of values stored in a permanent file, processing the fetched information by updating the structure values based on header tag to identify an object, generating a plurality of outputs for the processed information and displaying the plurality of outputs through the web user interface. The method further comprises the step of loading a project workspace for each login and allows an editing of latest version of the workspace. The input is at least one of the product features, the parameter names, the parameter values and the information related to the project management activities.

FIG. 1 illustrates a block diagram of a system for creating a verification plan for a product specification in an executable structure, according to an embodiment herein. With respect to FIG. 1, the system includes a web user interface 101, a temporary storage 102, a processing module 103 and a secondary storage 104. The web user interface 101 includes an input module 105 for collecting the data input from the users. The temporary storage 102 stores the input data collected by the input module 105. The processing module 103 fetches the input data from the temporary storage 102 and processes the data by inserting the structure values into a permanent file based on header tag to identify an object. The web user interface 101 further includes an output module 106 for displaying the output in a plurality of formats such as a HTML, a graph, and a chart. The secondary storage 104 also stores a copy of the generated output.

The system further includes a version control module 107 having one or more standard version control systems such as CVS, SVN etc. The input module 105 of the web user interface collects the input from the user. The input is at least one of but not limited to the product features, the parameter names, the parameter values and information related to the project management activities. The input module 105 allows the user to enter the input in the multiple tabs. The input module 105 further allows the user to define at least one of the product parameters, product variables, values for the parameters, milestones for each verification plan execution, logic for combination of the product variables and an order for execution of the logic. The input module 105 further enables a grouping of the verification plan scenarios based on at least one of the product features, an assignee and a milestone of the project. The input module 105 allows the user to set a priority for the project execution and provides an easy way to rename the variables and the parameters in the project specification.

The output module 106 of the web user interface 101 provides the user with the options to view the output in the various formats but not limited to a chart, a web page and a graph. The output module 106 allows the user to add the filters to the generated reports based on the various parameters such as but not limited to the product features, a product assignee and a product scope. The output module 106 further allows the user to download the complete workspace of the project and to provide a reusability of the workspace for another project.

The temporary storage 102 comprises of the multiple XML files for storing the inputs provided in the different tabs in an interconnected fashion. The XML files act as a cache file between a web user interface 101 and a permanent file. The temporary storage 102 helps in re-defining the input parameters dynamically for each execution. Further the cache helps in keeping the original data intact for the generation of the report files.

The processing module 103 takes the input from the temporary storage and the secondary storage to process the data. The processing module 103 inserts the values into a permanent file stored on the secondary storage 104 by identifying the corresponding parameters with the help of a header tag. The permanent file is a data file containing a verification plan skeleton. The processing module 103 checks both the temporary storage 102 and the workspace on the secondary storage 104 based on the control inputs provided to keep the data intact.

The secondary storage 104 stores the output generated by the processing module. The permanent file is also stored on the secondary storage 104. The secondary storage 104 also includes the data management techniques such as but not limited to a version control and workspace management. The version control technique is any one of standard version control systems such as CVS, SVN etc.

Figure 2:
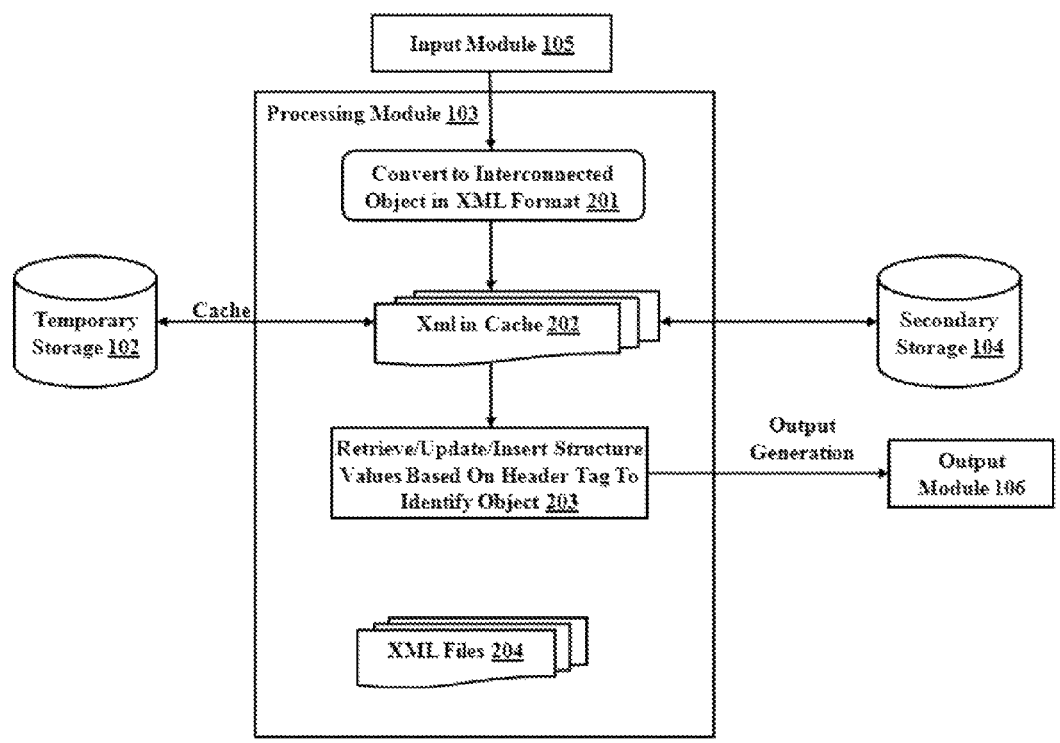
FIG. 2 illustrates a functional block diagram of a processing module for a verification plan in executable structures, according to an embodiment herein.

FIG. 2 illustrates a functional block diagram of a processing module used to represent the verification plan in executable structures, according to an embodiment herein. With respect to FIG. 2, the processing module 104 takes the input from the temporary storage 102 and the secondary storage 104 to processes the data. The processing module 103 inserts the values into a permanent file stored on the secondary storage 104 by identifying the corresponding parameters with the help of header tag. The permanent file is a data file containing a verification plan skeleton. The processing module 103 checks both the temporary storage 102 and the workspace on the secondary storage 104 based on the control inputs provided to keep the data intact.

The secondary storage 104 stores the output generated by the processing module 103. The permanent file is also stored on the secondary storage 104. The secondary storage 104 also includes the data management techniques such as but not limited to the version control module 107 and the workspace management. The version control technique is any one of standard version control systems such as CVS, SVN etc.

The output module 106 provides the user with the options to view the output in the various formats but not limited to a chart, a web page and a graph. The output module 106 allows the user to add the filters to the generated reports based on various parameters such as but not limited to the product features, the product assignee and the product scope. The output module 106 further allows the user to download the complete workspace of the project to provide a reusability of the workspace for another project.

Figure 3:
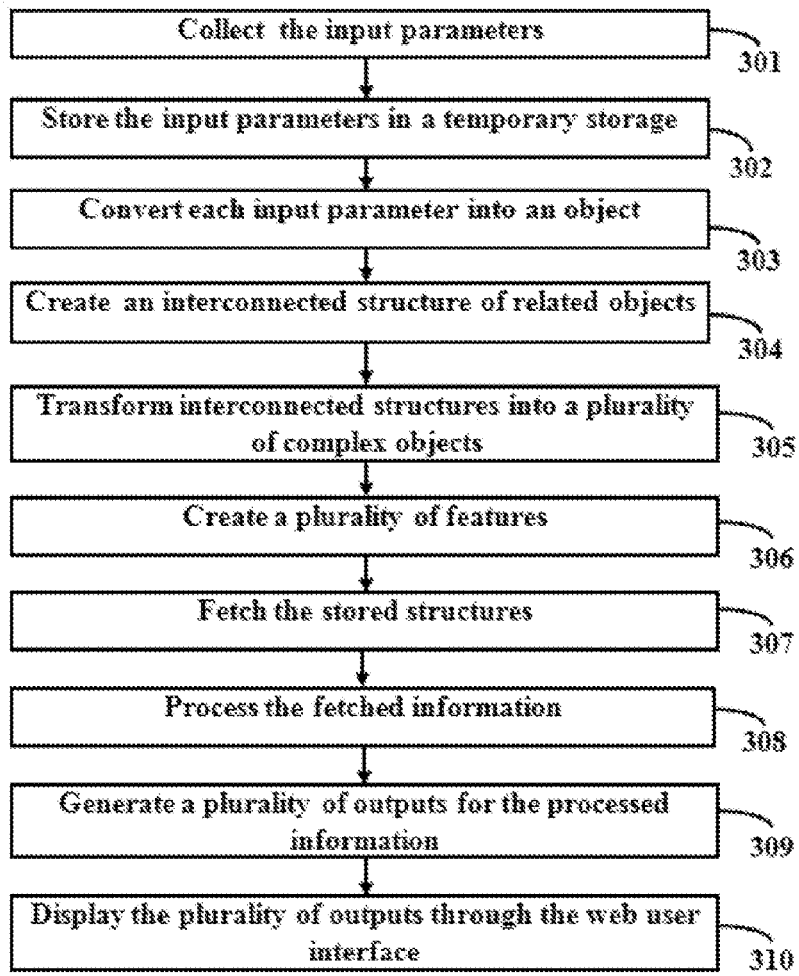
FIG. 3 illustrates a flow chart for a method of creating a verification plan in executable structures for verifying a product specification, according to an embodiment herein.

FIG. 3 illustrates a flow chart for a method of creating a verification plan in the executable structures for verifying a product specification, according to an embodiment herein. The web user interface collects the input parameters provided by the users through an input module (301). The collected input parameters are then stored in a temporary storage (302). Further each of the input parameter is converted to an object of suitable format such as XML (303). An interconnected structure of related objects is created (304). The input parameters are converted into a plurality of complex objects such as but not limited to combos, sequences, macros by the processing module (305). Further a plurality of features is created using the plurality of complex objects (306). The processing module fetches the stored interconnected structures (307). The data structures are processed by inserting the structure values into a permanent file based on header tag to identify object (308). Further the output module generates an output based on the processed information (309). The output thus generated is displayed through the web user interface (310). The input is at least one of but not limited to the product features, the parameter names, the parameter values and the information related to the project management activities. The displayed output is in a plurality of formats. The plurality of formats includes but is not limited to a chart, a graph, and a web page.

Figure 4:
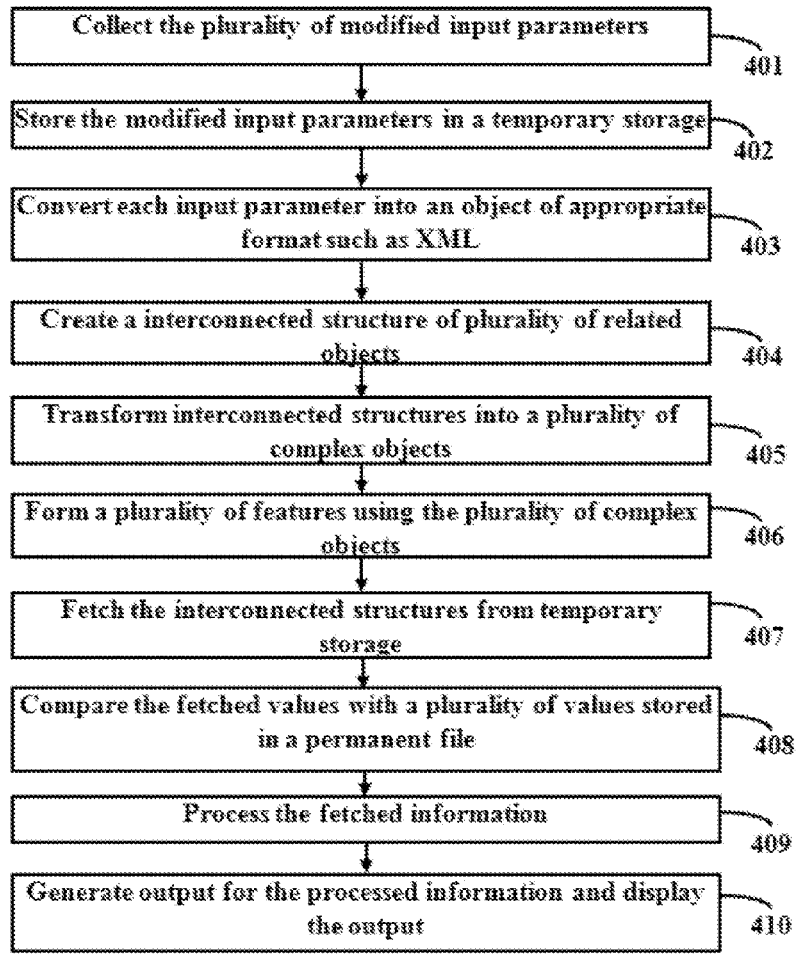
FIG. 4 illustrates a flow chart for a method of updating a verification plan according to the changes in a product specification for a verification of the product specification, according to an embodiment herein.

FIG. 4 illustrates a flow chart for a method of updating a verification plan in the executable structures for verifying a product specification using the web user interface, according to an embodiment herein. The verification plan in the executable structure is a platform independent methodology and is suitable for both software and hardware form of a product. The verification plan can be updated by collecting the input parameters modified by the user according to the user requirements through a web user interface (401). The modified input parameters are stored in a temporary storage (402). Each input parameter is further converted into an object of appropriate format (403). The interconnected structures of related objects are created (404). Further the processing module transforms the interconnected structures into a plurality of complex objects (405). A plurality of features is generated using the plurality of complex objects (406). The processing module further fetches the stored interconnected structures (407). The fetched values are compared with the values stored in the permanent file (408). The processing module further processes the fetched information by updating the structure values to modified values based on header tag to identify an object (409). The output of the processed information is generated. The output display is provided on the web user interface (410). The input is at least one of but not limited to the product features, the parameter names, the parameter values and the information related to the project management activities. The output is displayed in a plurality of formats. The plurality of formats includes but is not limited to a chart, a graph, and a web page.

Figure 5:
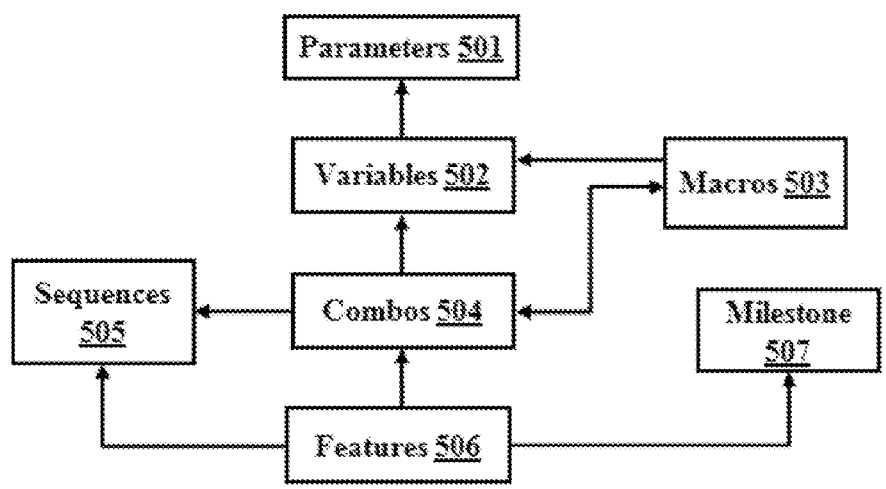
FIG. 5 illustrates a functional block diagram of a system for creating a verification plan indicating an internal connection of complex objects forming the verification plan, according to an embodiment herein.

FIG. 5 illustrates a functional block diagram of a system for creating a verification plan indicating an internal connection of complex objects forming the verification plan, according to an embodiment herein. With respect to FIG. 5, the input parameters 501 are assigned with the variable names. The variables 502 are converted into complex objects such as combos 504 and sequences 505 using macros 503. Subsequently, the combos 504 and sequences 505 form the features 506. The milestone 507 variable is directly connected to feature 506 which is used in report generation and verification estimation.

Figure 6:
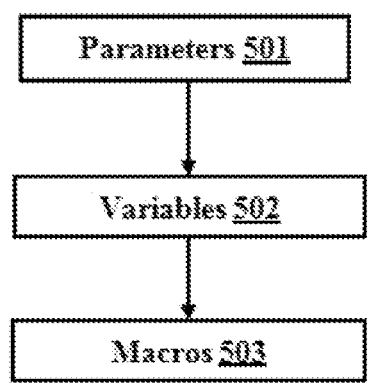
FIG. 6 illustrates a functional block diagram of a system for creating a verification plan indicating the variables of the complex objects, according to an embodiment herein.

FIG. 6 illustrates a functional block diagram of a system for creating a verification plan indicating the variables of the complex objects, according to an embodiment herein. With respect to FIG. 6, the parameters 501, the variables 502 and the macros 503 are the simple variables which are used to form the complex objects such as sequence, combos and feature.

Figure 7:
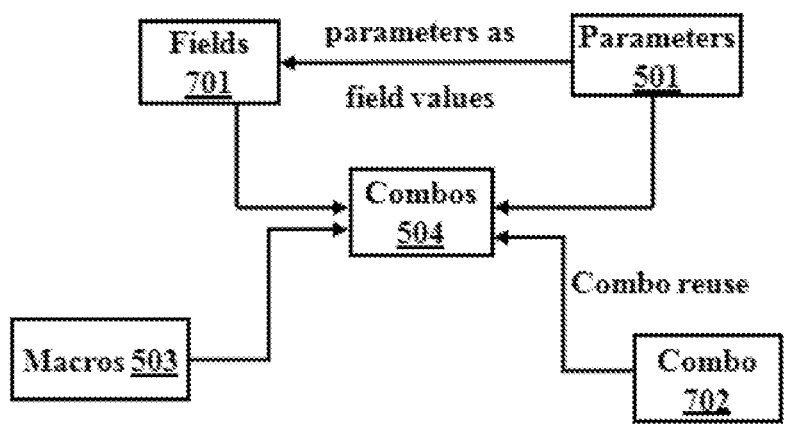
FIG. 7 illustrates a functional block diagram of a system for creating a verification plan indicating the structure and connection of combos, according to an embodiment herein.

FIG. 7 illustrates a functional block diagram of a system for creating a verification plan indicating the structure and connection of combos, according to an embodiment herein. With respect to FIG. 7, a plurality of fields 701 is defined and the input parameters 501 are fed as field values for the plurality of fields. The input parameters 501 along with the fields 701 are converted into combos 504 using the macros 503. Further a plurality of the existing combos 702 are used to derive the combos 504.

Figure 8:
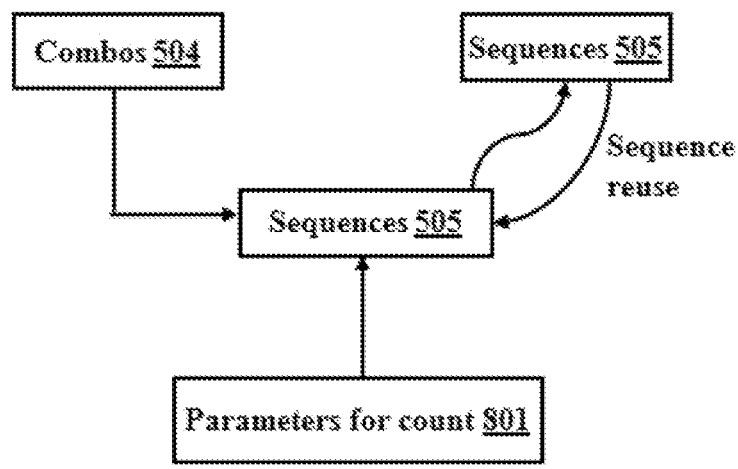
FIG. 8 illustrates a functional block diagram of a system for creating a verification plan indicating the structure and connection of sequences, according to an embodiment herein.

FIG. 8 illustrates a functional block diagram of a system for creating a verification plan indicating the structure and connection of sequences, according to an embodiment herein. With respect to FIG. 8, a plurality of sequences 505 are derived from the combos 504, existing sequences and parameters for count 801. The parameter for count 801 corresponds to the number of sequences in the plurality of sequences 505.

The method of representing the verification plan in executable structures can be used in many applications ranging from ASIC verification to embedded software verifications such as stacks, algorithms and protocol implementations. The verification plan is used with the user interface parser to provide the paths to either a code specific to a particular platform or to connect to an automated verification closure using one of the programming interface, the sockets or some other methods. The plan is independent of any hardware platform, the verification components, a methodology and a library. For example, the executable verification plan can be plugged into any system tester equipment with appropriate interfaces and the tester can exercise the generic hardware for a functional correctness. The same verification plan can later be partitioned into the hardware and software components and they can be separately used to verify the simulated hardware or implemented software. The method representing the verification plan in the executable structures is applied in the various application areas such as but not limited to a functional verification of semiconductor products, DO-254 compliant verification methods and embedded software validation or testing.

The embodiments herein provide a method and system for creating a verification plan in the executable structures for verifying a product specification using the web user interface. The embodiments herein creates a verification plan to enable a direct mapping of a product design specification to a product design verification plan and to easily adopt the changes in a product specification to verification plan. The verification plan according to the embodiments herein allows the users to define the values for the product parameters and variables, define the milestone for each verification plan, define a logic for combination of the product variables that needs to be exercised during a verification process, define the order in which logic should be executed during a testing of a verification plan, setting the priority for executing a plurality of test plans, viewing the plan in the HTML format, adding the filters based on a feature, an assignee and a scope of the project, and to generate the reports at each entry stage. The verification plan according to the embodiments herein minimizes the time and effort involved in adopting the changes in a product specification to verification planning, minimizes the effort in modifying the plan whenever a product specification is changed and reduces a verification management overhead and time. The verification plan according to the embodiments herein can be represented in any required format irrespective of the working platform. The verification plan according to the embodiments herein enables the users to view the differences in the multiple versions of the same project visually with multiple filters and enables a reusability of the plan using a workspace upload feature.

The foregoing description of the specific embodiments herein will so fully reveal the general nature of the embodiments herein that others can, by applying current knowledge, readily modify and/or adapt for various applications such specific embodiments herein without departing from the generic concept, and, therefore, such adaptations and modifications should and are intended to be comprehended within the meaning and range uf equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for creating a verification plan in an executable structure for verifying a product specification, the method comprising steps of:
    collecting a plurality of input parameters through a web user interface;
    storing the plurality of input parameters in a temporary storage;
    converting each input parameter into an object of a defined format;
    creating an interconnected structure of related objects;
    transforming the interconnected structures into a plurality of complex objects;
    generating a plurality of features using the plurality of complex objects, and wherein generating the plurality of features includes mapping product milestones onto the plurality of features, and wherein the plurality of complex objects is at least one of a combo, a sequence and a macro;
    fetching a stored information;
    processing the fetched information by inserting a structure values into a permanent file based on a header tag to identify an object;
    creating a project workspace for each login;
    editing a latest version of the project workspace;
    generating an output of the processed information; and
    displaying the output through a web user interface.

2. The method of claim 1, further comprises updating a verification plan whenever a product specification is changed.

3. The method of claim 2, wherein updating the verification plan comprising steps of:

collecting a plurality of modified input parameters through the web user interface;

storing the plurality of modified input parameters in a temporary storage;

converting each input parameter into an object of an appropriate format;

creating an interconnected structure of the plurality of related objects;

transforming the interconnected structures into a plurality of complex objects;

generating a plurality of features using the plurality of complex objects;

fetching the interconnected structures from a temporary storage by a processing module;

comparing the fetched values with a plurality of values stored in a permanent file;

processing the fetched values by updating structure values based on header tag to identify an object;

generating an output of a processed information; and displaying the output through the web user interface.

4. The method of claim 1, wherein the plurality of input parameters is at least one of product features, parameter names, parameter values and information related to project management activities.

5. The method of claim 1, wherein the outputs is at least One of the verification plan and product milestones.

6. The method of claim 1, wherein the permanent file is a data file containing a verification plan framework.

7. The method of claim 1, further comprises:

grouping a plurality of verification plan scenarios based on at least one of product features, an assignee and a milestone of a project;

defining at least one of the product parameters, product variables, values for the parameters, milestones for execution of each verification plan, logic for combination of the product variables and an order for execution of the logic; setting a priority for a project execution;

downloading a complete workspace of a project to provide a reusability of the workspace for another project; and adding filters to generated reports based on a plurality of parameters, and wherein the plurality of parameters includes product features, a product assignee and a product scope.

8. A system for creating a verification plan in an executable structure for verifying a product specification, the system comprising:

a web user interface for an user to enter a plurality of input parameters in a tabbed view, and wherein, the web user interface comprises an put module for collecting the plurality of inputs through the web user interface;

a temporary storage for storing the plurality of input parameters;

a processing module for processing an interconnected structure of related objects and generating a plurality of outputs, and wherein the processing module is adapted to create an interconnected structure of related objects, to transform the interconnected structures into a plurality of complex objects, to generate a plurality of features using the plurality of complex objects, to fetching a stored information and to process the stored information, and wherein product milestones are mapped onto the plurality of features in generating the plurality of features, and wherein the plurality of complex objects is at least one of a combo, a sequence and a macro;

a secondary storage for storing a plurality of outputs; and an output module provided in the web user interface for displaying the plurality of outputs in a plurality of formats, and wherein the output module allows the user to download a complete workspace of a project to provide a reusability of the workspace for another project, and wherein the output module allows the user to add filters to generated reports based on a plurality of parameters, and wherein the plurality of parameters includes product features, a product assignee and a product scope;

wherein the temporary storage comprises a plurality of XML files for converting each input parameter into an object of an appropriate format and creating an interconnected structure of a plurality of related objects.

9. The system of claim 8, the plurality of formats is at least one of a HTML, a graph, a chart.

10. The system of claim 8, wherein the plurality of XML files acts like a cache file between a front-end and permanent file to re-define values and inputs dynamically for each execution.

11. The system of claim 8, wherein the secondary storage is disk storage for storing the output and wherein the secondary storage includes a plurality of data management techniques.

12. The system of claim 8, wherein the input module groups a plurality of verification plan scenarios based on at least one of product features, an assignee and a milestone of a project, and wherein the input module allows the user to define at least one of the product parameters, product variables, values for the parameters, milestones for each verification plan execution, logic for combination of the product variables and an order for execution of the logic, and wherein the input module allows the user to set a priority for a project execution.

* * * * *